May 3, 1966 B. D. LOUGHLIN ETAL 3,249,695

CONTROL APPARATUS FOR A TELEVISION RECEIVER

Filed Sept. 13, 1962 2 Sheets-Sheet 1

3,249,695
Patented May 3, 1966

1

3,249,695

CONTROL APPARATUS FOR A TELEVISION RECEIVER

Bernard D. Loughlin, Huntington, N.Y., and Stephen P. Ronzheimer, Elmhurst, Ill., assignors to Hazeltine Research, Inc., a corporation of Illinois Filed Sept. 13, 1962, Ser. No. 224,276
7 Claims. (Cl. 178—7.5)

Figure 1:
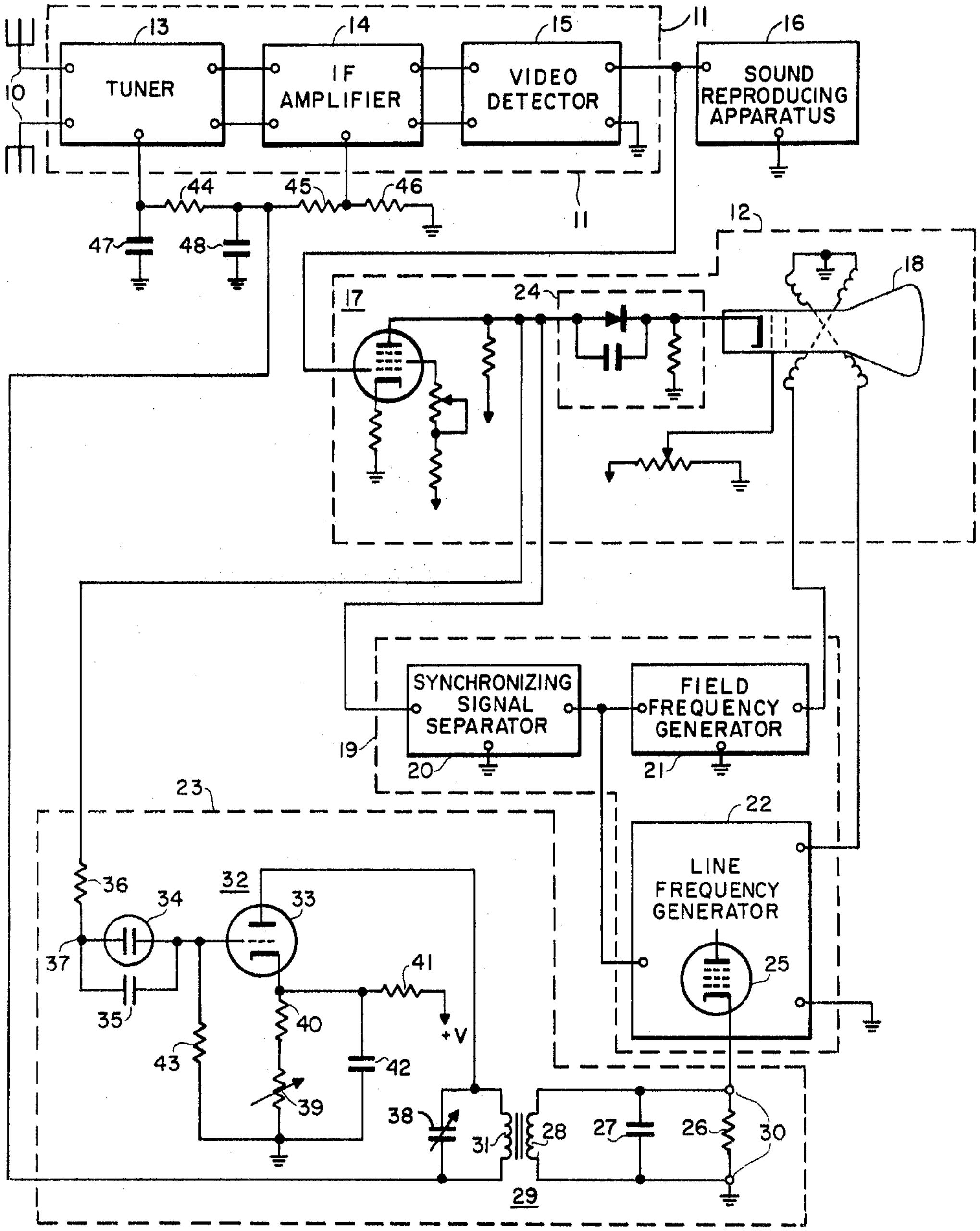

The present invention relates to control apparatus for a television receiver. More particularly, it relates to such apparatus useful in a television receiver for improving black level operation at the image-reproducing device.

Several difficulties arise when direct-current (D.-C.) coupling is used in conjunction with conventional types of automatic-gain-control (AGC) circuits which derive AGC from the peak of the synchronizing pulses. In a typical from of D.-C. coupling in a television receiver the video detector is D.-C. coupled to the video amplifier grid, and the video amplifier plate is D.-C. coupled to the picture tube cathode. Conventional time-gated, i.e., keyed, AGC circuits respond to the signal at the video amplifier plate during the horizontal scanning interval and use the peaks of the synchronizing pulses as the reference level in establishing AGC. Thus, whenever any condition arises which would tend to cause a variation in amplitude in the signal at the video amplifier plate, the AGC circuit introduces a counteracting gain change which will keep the instantaneous voltage of the synchronizing pulse peaks at a relatively constant level. Even though changes in video signal amplitude may occur, the synchronizing peaks are maintained at a constant D.-C. level.

Some of the conditions which result in changes in signal amplitude at the video amplifier plate are differences in radio-frequency signal level from different stations, variations in contrast setting and variations in receiver fine tuning adjustment. For example, if the contrast control is of the type located in the cathode or screen circuit of the video amplifier, changes in control setting will effect changes in peak-to-peak signal amplitude at the video amplifier plate, but the AGC circuit will function in such a manner that the plate potential corresponding to synchronizing pulse peaks is maintained nearly constant. Thus, by maintaining synchronizing pulse peaks at a constant potential, while at the same time changing the video signal amplitude, a change in blanking level occurs. Blanking level and black level in the television signal are nearly the same, differing by a small fixed amount referred to in the art as "set up." Therefore, with D.-C. coupling, the net result of the foregoing operation is an undesired shift in background brightness. This results because if black level were initially set at beam current cutoff in the picture tube, the shift in black level would obviously result in improper black level operation.

As another example, when the receiver is detuned in the direction to introduce sound interference in the picture, the D.-C. component of the signal at the video amplifier plate gradually increases with detuning due to the detected D.-C. component produced from the sound carrier, but synchronizing pulse peaks are held at a constant level. If the fine tuning range is sufficient, the receiver may detune until the video signal completely disappears, leaving only the D.-C. component due to the resulting sound carrier, and the D.-C. potential at the video amplifier plate would, because of AGC action, be approximately the same as the level of synchronizing pulse peaks if the receiver were properly tuned. In the detuned condition, the D.-C. coupled picture tube is biased well beyond cutoff and is in the "blacker-than-black" condition, exhibiting a blank screen which is not even occasionally lit up by noise pulses. Should the viewer

Figure 3A:
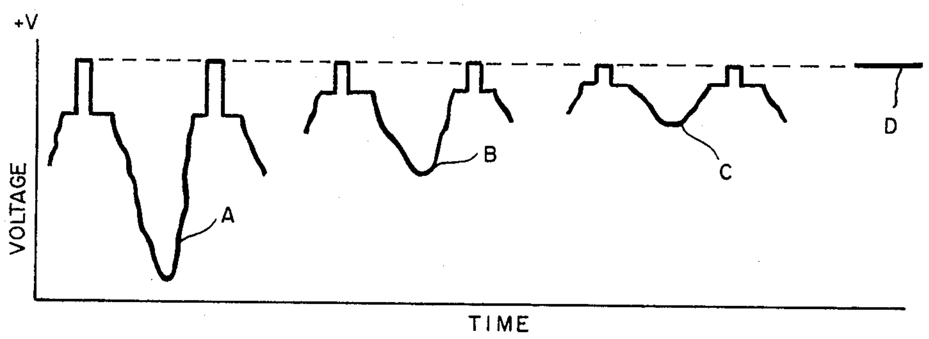

2 switch to a channel when the fine tuning is mistuned to this degree, he may become alarmed or confused by the lack of any light from the picture tube. If he should turn up the brightness, a blank raster would appear; but then, upon correctly tuning the receiver, the picture will be too bright and another adjustment of the brightness control would be required. The effect of mistuning on the black level is illustrated in FIG. 3*a*, waveforms A–D.

As still another example, synchronizing pulse peak amplitude may vary, even though the peak amplitude of the composite signal remains constant. These variations supposedly are to be restricted at the transmitter within fairly narrow limits according to Federal Communications Commission rules. However, observations have indicated that transmitters frequently permit synchronizing pulse peak amplitude variations which exceed the specified limits. The present invention minimizes the effects of these variations on black level performance.

While the aforementioned difficulties may be considered tolerable in the sense that proper correction can be made with manual brightness control adjustment, the described variations in black level are highly undesirable and would have poor acceptance by the viewer. It would, therefore, be desirable to maintain black level constant and independent of variations in signal amplitude. A close approach to this idea would be to maintain blanking level constant since, as mentioned, black level and blanking level are nearly the same.

Circuits for using blanking level as a reference instead of sync peaks have been proposed in the prior art, but have not received extensive use in home television receivers. Such circuits have been rather complex in a variety of ways. Some have used separate delay multivibrators and/or separate keying pulse generators. Another complex approach has used "inverted" operation with AGC phase inverter amplifiers and split B supply. An example of the latter is given in the paper entitled, "A New Fast Noise Immune Television AGC Circuit," by K. R. Wendt, R.C.A. Review, September 1948, pages 385–393.

To maintain black level constant when synchronizing pulse peak referencing and full D.-C. coupling are employed, a flat AGC characteristic is required. However, when AGC is derived from separate, simple means, such as directly from the video detector, a less perfect AGC characteristic is obtained. A method will be described hereinafter by which it is possible to provide black level stabilization even though the AGC characteristic may not be flat.

It is, therefore, an object of the present invention to provide automatic-control apparatus for a television receiver that maintains correct black level operation at the image-reproducing device.

It is another object of the invention to provide a simple type of control apparatus that facilitates accurate reproduction of the television picture signal.

It is a further object of the invention to provide a simple type of control apparatus that stabilizes black in the reproduced image in a way that permits AGC to be derived from a simple means having a nonflat characteristic.

In accordance with the present invention, there is provided control apparatus for a television receiver of the type adapted to receive a negative modulation television signal including synchronizing pulses extending from a reference level which follows said pulses and having image-reproducing apparatus including a signal-translating channel and an image-reproducing device. The control apparatus includes means for supplying at least the reference level of the signal. The apparatus also includes horizontal deflection apparatus having an output stage and in which flyback pulses are derived. Means coupled in the current path of the output stage and excited by a sudden decrease of current in that stage is also included for deriving an oscillatory signal of frequency different from the oscillation frequency of the flyback pulses. The control apparatus further includes means responsive to the reference level and to the oscillatory signal for deriving an automatic-control effect. This control effect is used for stabilizing the reference level within the television receiver image-reproducing apparatus at a level corresponding to that which is required for correct black level operation at the image-reproducing device.

For a better understanding of the present invention, together with other and further objects thereof, reference is had to the following description, taken in connection with the accompanying drawings, and its scope will be pointed out in the appended claims.

Figure 2:
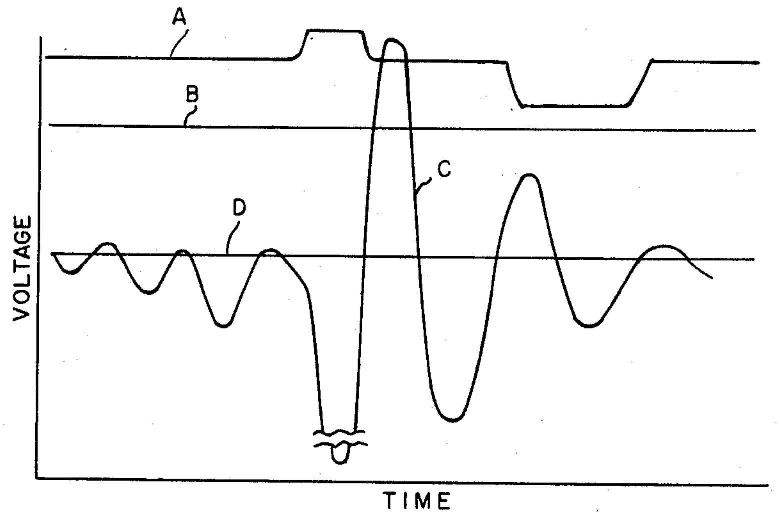
Figure 3B:
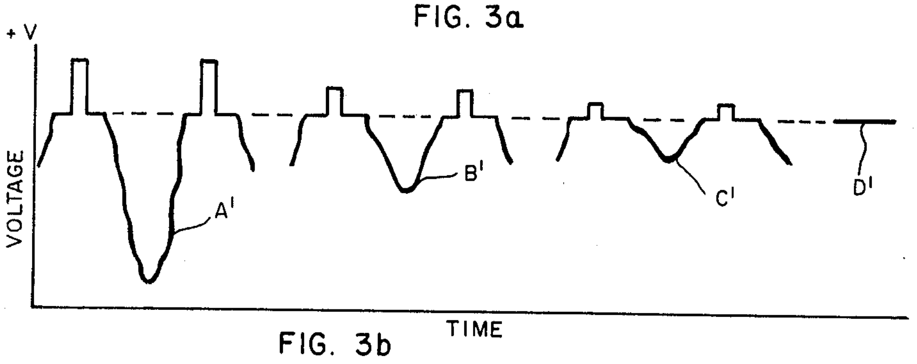

Referring to the drawings:

FIG. 1 is a circuit diagram, partly schematic, of a television receiver embodying a particular form of the present invention;

FIG. 2, A through D, inclusive, are graphic representations useful in explaining the operation of the invention, and FIGS. 3*a*–3*b* comprise graphs useful in explaining the advantage of using the particular form of the invention over the more conventional type of circuitry.

*Receiver system of FIG. 1*

Referring now more particularly to FIG. 1, there is represented a television receiver of the superheterodyne type designed for negative modulation. As shown, the receiver comprises, in part, antenna system 10, coupled to the input of unit 11, which, in turn, is coupled to the input of image-reproducing apparatus 12. Unit 11 includes the usual tuner 13, intermediate-frequency amplifier 14, and video detector 15 from which are derived two output components. The sounds modulated intercarrier beat note component is applied to sound-reproducing apparatus 16, wherein it is amplified, detected, and reproduced by the sound-reproducing device. The video signal component is connected to the input of apparatus 12 which comprises video amplifier 17 and a cathode-ray type of image-reproducing device 18, coupled to amplifier 17 through a coupling network 24. This network operates such that for scenes of low or medium average brightness, device 18 is D.-C. coupled to amplifier 17; whereas for scenes of high average brightness, device 18 is A.-C. coupled to amplifier 14. A more complete description is given in copending application Serial No. 215,964, filed August 9, 1962, and entitled, "Black Level Stabilization System for a Television Receiver." The invention described hereinafter, however, is not limited to such a coupling arrangement, but could also be used to advantage where D.-C. coupling is employed exclusively. Synchronizing and scanning apparatus 19, consisting of synchronizing signal separator 20 and field and line frequency generators 21 and 22, respectively, is coupled to apparatus 12 for controlling beam deflection in the usual manner. Control apparatus 23, constructed in accordance with the present invention and to be described subsequently, is also coupled to apparatus 12 for controlling black level operation therein. As will become clear hereinafter, it is the function of the control apparatus 23, as embodied in FIG. 1, to control the degree of amplification within tuner 13 and/or amplifier 14 such that the signal presented to detector 15 is maintained within a narrow intensity range for a wide range of received television signal intensities and, more particularly, so that black is stabilized at image-reproducing device 18.

*Control apparatus of FIG. 1*

Referring now more particularly to control apparatus 23 which embodies one form of the present invention, the arrangement there represented comprises means for supplying at least that portion of the television signal, hereinafter referred to as the reference level, which follows the synchronizing pulse portion of the television signal and which precedes the image-representative portion. In the embodiment of FIG. 1, this reference level is the blanking level corresponding to a level of intensity at which the image-reproducing device should be cut off, i.e., at which its electron beam should be extinguished. This signal supply means comprises, in FIG. 1, the output circuit of video amplifier 17 for supplying a complete video signal, although it will be understood that the signal supply means need have a frequency only as wide as is necessary to pass the reference level portion of the video signal. Control apparatus 23 also includes horizontal deflection apparatus, located in line frequency generator 22, in which flyback pulses are derived. The output stage of the deflection apparatus includes a vacuum tube 25 through which current flows during the scanning or image period of the television signal.

Means coupled in the current path of vacuum tube 25, and excited by a sudden decrease of current in that tube, is also included in apparatus 23 for deriving an oscillatory signal of frequency different from the oscillation frequency of the flyback pulses. Specifically, this means constitutes a ringing circuit, including damping resistor 26, capacitor 27, transformer 29, and capacitor 38, all connected in the cathode circuit of tube 25 at terminals 30. As will be understood more fully hereinafter, the FIG. 1 ringing circuit parameters are such that the oscillatory signal frequency is greater than flyback frequency. Transformer 29 also serves as a means for stepping up the amplitude of the oscillatory signal appearing during the ringing circuit excitation.

Means responsive to the reference level and to the first positive half cycle of the amplified oscillatory signal for deriving an automatic-gain-control effect from the reference level is also included in apparatus 23. Such means may include the keyed rectifier circuit 32 having a triode type of vacuum tube 33, the control grid of which is connected to amplifier 17 through the network consisting of neon tube 34 and capacitor 35 in parallel, resistor 36, and input terminal 37. Besides supplying the reference level, video amplifier 17 also supplies the synchronizing pulses that immediately precede it, the pulses extending from that level in a positive direction. The oscillatory signal appearing across secondary winding 31 is coupled to the plate of keyed tube 33. In addition, the cathode biasing network consisting of potentiometer 39, resistors 40 and 41, bypass capacitor 42, and voltage supply +V are also included. The series circuit consisting of resistor 43, neon tube 34, and resistor 36 serves to provide a D.-C. potential step-down of the video signal applied to the control grid of tube 33 so that a smaller oscillatory signal is required to cause tube 33 to conduct. Capacitor 35 is connected in parallel with neon tube 34 to insure that neither the A.-C. component nor the changes in the D.-C. component of the video signal are attenuated by tube 34. The AGC effect derived during the conduction period of tube 33 is applied to tuner 13 and IF amplifier 14 for adjusting the bias voltage therein. This is accomplished by connecting the output circuit of vacuum tube 33 to tuner 13 and amplifier 14 and includes the D.-C. path through secondary winding 31 and resistor 44 for tuner 13, and winding 31 and voltage divider resistors 45 and 46 for amplifier 14. Bypass capacitors 47 and 48 are included to prevent rapidly varying signals from changing the bias voltage levels prescribed by the AGC effect. As a result, the reference level within image-reproducing apparatus 12 is stabilized at a level corresponding to that required for correct black level operation at image-reproducing device 18.

The manner in which control apparatus 23 is connected within the receiver, i.e. D.-C. coupled from video detector 15 to image tube 18, allows for maintaining correct black level operation at the image-reproducing device by effectively neglecting the synchronizing pulses and deriving the AGC effect from the reference level that follows.

In operation, the amplified demodulated picture carrier or video signal output of video amplifier 17, waveform A in FIG. 2, is coupled to the control grid of vacuum tube 33 through input terminal 37, resistor 36, and the path consisting of neon tube 34 and capacitor 35 connected in parallel. During the scanning period, horizontal output tube 25 conducts, and most of the cathode current flows through the primary winding 28 of transformer 29. At the beginning of retrace, the horizontal output tube cathode current is abruptly cut off. This sudden decrease in current through primary winding 28 induces a voltage across that winding and an oscillation is set up in the ringing circuit including the primary and secondary circuits of transformer 29. The ringing circuit impedance at terminals 30 is relatively low, to avoid excessive A.-C. components on the cathode of tube 25 which might otherwise cause tube 25 to go into conduction during part of the retrace time. The secondary circuit impedance is much higher, however; a voltage step-up being provided in transformer 29 so that the output signal will be of sufficient amplitude to key AGC tube 33. This increased amplitude signal is applied directly to the plate of tube 33 and is shown as waveform C in FIG. 2. It will be noted that during the first half cycle of oscillation, the plate of tube 33 is negative with respect to ground, waveform D in FIG. 2. Thus, plate current is not permitted to flow during the horizontal synchronizing pulse interval. The necessary keying action is provided during the second half cycle when the plate of tube 33 is positive with respect to the cathode potential, waveform B in FIG. 2. Trimmer capacitor 38 provides an adjustment of secondary tuning to properly position the keying pulse in the "back porch" region of the video signal. The horizontal scanning pulses do not interfere with keying action, therefore, and the AGC effect is derived during the "back porch" or blanking level, rather than on synchronizing pulse peaks.

While applicants do not wish to be limited to any particular set of circuit constants, the following have proved useful in control apparatus 23:

| | |
|---|---|
| Resistor **26**, ohms | 220 |
| Resistor **36**, kilohms | 18 |
| Resistor **40**, kilohms | 22 |
| Resistor **41**, kilohms | 33 |
| Resistor **43**, kilohms | 470 |
| Potentiometer **39**, kilohms (max.) | 10 |
| Capacitor **27**, microfarads | 0.0047 |
| Capacitor **35**, microfarads | 0.022 |
| Capacitor **42**, microfarads | 0.1 |
| Trimmer capacitor **38**, picofarads | 6–30 |
| Vacuum tube **33** | ½ 12AT7 |
| Vacuum tube **25** | 12DQ6A |
| Neon tube **34** | NE2 |
| Transformer **29** | |
| Primary winding, turns | 50 |
| Inductance, microhenries | 80 |
| Secondary winding, turns | 1500 |
| Series inductance, millihenries | 56 |
| Voltage supply +V, volts | 265 |

In synchronizing pulse peak referencing and full D.-C. coupling are employed in a television receiver in which AGC is derived from simple means, which may have a nonflat AGC characteristic, two problems are created which should be corrected if comfortable viewing is to result. These relate to high voltage power supply overload on high average brightness scenes, particularly when receiving strong signals, and sync-to-blanking level drift with signal level. Through the use of the aforedescribed coupling network 24, high voltage power supply overload effects can be minimized, however, since for conditions producing large power supply drain, the coupling arrangement approximates that of A.-C. coupling. The problem of undesirable drift of black with signal level can also be minimized if a D.-C. restoration effect is derived from the "back porch" rather than from the synchronizing pulse peaks. Thus, a less perfect AGC characteristic can be used and still maintain black level constant if the "back porch" reference system described herein is used to provide merely a D.-C. restoration function instead of the combined blanking level stabilization function and AGC function as in the previous embodiment.

As such, apparatus 23 may be connected as a D.-C. restorer in the television receiver of FIG. 1 to derive a different type of control effect from the reference level. The manner in which the connections of control apparatus 23 may be modified to operate in accordance with this second embodiment of the invention is fully described in application Serial No. 223,493, filed September 13, 1962, and entitled "Control Apparatus for a Television Receiver" which was abandoned December 24, 1964. These modifications involve principally only the points at which the input and output connections are made, control apparatus 23 being otherwise substantially unmodified in construction. It also assumes that A.-C. coupling is used from the detector 15 to video amplifier 17.

As in the embodiment just described, conduction occurs in the keyed tube only during the "back porch" interval; and the control effect, therefore, is desired from the blanking reference level. However, in the D.-C. restorer embodiment, this control effect is not used to maintain the intensity of the signal presented to detector 15 constant, but is used to vary the bias on video amplifier 17, thereby producing a compensating action to counteract any changes in the transmitted picture signal. As a result, the reference level is stabilized at a level corresponding to that which is required for correct black level operation at image-reproducing device 18, i.e., black in the image will be reproduced at that level which was transmitted.

Waveforms A′–D′ in FIG. 3*b*, derived from a television receiver utilizing the present invention, show that the troublesome black level variations that were inherent in the operation of the conventional sync tip keyed AGC circuits have been eliminated. Thus, the viewer is freed of the necessity of frequently adjusting the brightness control. It is believed that this is a great advantage, since proper adjustment of the brightness control by the average consumer seems to be somewhat more difficult to achieve in a receiver with D.-C. restoration or coupling than in an A.-C. coupled receiver.

While there have been described what are, at present, considered to be the preferred embodiments of the present invention, it will be obvious to those skilled in the art that various changes and modifications may be made therein without departing from the invention, and it is, therefore, aimed to cover all such changes and modifications as fall within the true spirit and scope of the invention.

What is claimed is:

1. Control apparatus for a television receiver of the type adapted to receive a negative modulation television signal including synchronizing pulses followed by a reference level of amplitude different from that of said pulses and having image-reproducing apparatus including a signal-translating channel and an image-reproducing device, said control apparatus comprising:

means for supplying at least the reference level of said signal;

horizontal deflection apparatus having an output stage and in which flyback pulses are derived;

means, including a ringing circuit coupled in the current path of said output stage and excited by a sudden decrease of current in said stage, for deriving an oscillatory signal of frequency different from the oscillation frequency of said flyback pulses;

and means responsive to said reference level and to said oscillatory signal for deriving an automatic-control effect for stabilizing the reference level of said signal within said image-reproducing apparatus at a level corresponding to that which is required for correct black level operation at the image-reproducing device.

2. Control apparatus in accordance with claim 1, in which the frequency of said oscillatory signal is greater than the oscillation frequency of said flyback pulses and in which the control effect deriving means is responsive to the first positive-going half cycle of the oscillatory signal.

3. Control apparatus for a television receiver of the type adapted to receive a negative modulation television signal including synchronizing pulses followed by a reference level of amplitude different from that of said pulses and having image-reproducing apparatus including a signal-translating channel and an image-reproducing device, said control apparatus comprising:

means for supplying at least the reference level of said signal;

horizontal deflection apparatus having an output stage and in which flyback pulses are derived;

means coupled in the current path of said output stage and excited by a sudden decrease of current in said stage for deriving an oscillatory signal of frequency different from the oscillation frequency of said flyback pulses;

and means including a keyed rectifier circuit having a triode type vacuum tube with the control grid thereof coupled to said supply means and with the anode thereof coupled to said oscillatory signal deriving means for deriving an automatic-control effect for stabilizing the reference level of said signal within said image-reproducing apparatus at a level corresponding to that which is required for correct black level operation at the image-reproducing device.

4. Control apparatus for a television receiver of the type adapted to receive a negative modulation television signal including synchronizing pulses followed by a reference level of amplitude different from that of said pulses and having a video detector and image-reproducing apparatus including a signal-translating channel having intermediate amplifier circuits and an image-reproducing device, said control apparatus comprising:

means for supplying at least the reference level of said signal;

horizontal deflection apparatus having an output stage and in which flyback pulses are derived;

means, including a ringing circuit coupled in the current path of said output stage and excited by a sudden decrease of current in said stage, for deriving and oscillatory signal of frequency different from the oscillation frequency of said flyback pulses;

and means responsive to said reference level and to said oscillatory signal for deriving an automatic-control effect used to maintain the television signal presented to the video detector within a narrow intensity range for a wide range of received signal intensities for stabilizing the reference level of said signal in said image-reproducing apparatus at a level corresponding to that which is required for correct black level operation at the image-reproducing device.

5. Control apparatus in accordance with claim 4, in which the supplied reference level is a blanking level.

6. Control apparatus for a television receiver of the type adapted to receive a negative modulation television signal including synchronizing pulses followed by a reference level of ampliutde different from that of said pulses and having image-reproducing apparatus including a signal-translating channel and an image-reproducing device, said control apparatus comprising:

means for supplying at least the reference level of said signal;

horizontal deflection apparatus having an output stage and in which flyback pulses are derived;

means including a ringing circuit coupled in the current path of said output stage and excited by a sudden decrease of current in said stage for deriving an oscillatory signal of frequency different from the oscillation frequency of said flyback pulses, said ringing circuit including a step-up transformer for increasing the amplitude of said oscillatory signal;

and means responsive to said reference level and to said oscillatory signal for deriving an automatic control effect for stabilizing the reference level of said signal within said image-reproducing apparatus at a level corresponding to that which is required for correct black level operation at the image-reproducing device.

7. Control apparatus for a television receiver of the type adapted to receive a negative modulation television signal including synchronizing pulses followed by a reference level of amplitude different from that of said pulses and having image-reproducing apparatus including a signal-translating channel and an image-reproducing device, said control apparatus comprising:

means for supplying at least the reference level of said signal;

horizontal deflection apparatus having an output stage including a vacuum tube, and in which flyback pulses are derived;

means including a ringing circuit coupled in a cathode circuit of said vacuum tube and excited by a sudden decrease of current in said vacuum tube for deriving an oscillatory signal of frequency different from the oscillation frequency of said flyback pulses;

and means responsive to said reference level and to said oscillatory signal for deriving an automatic control effect for stabilizing the reference level of said signal within said image-reproducing apparatus at a level corresponding to that which is required for correct black level operation at the image-reproducing device.

References Cited by the Examiner

FOREIGN PATENTS 762,685 12/1956 Great Britain.

DAVID G. REDINBAUGH, *Primary Examiner.*

JOHN McHUGH, *Assistant Examiner.*